Oct. 13, 1936.  E. A. SKYIEPAL  2,057,213

ROLLER BEARING

Filed April 23, 1934

Inventor
EDWARD A. SKYIEPAL.
Jesse R. Stone
Lester B. Clark

By

Attorneys

Patented Oct. 13, 1936

2,057,213

UNITED STATES PATENT OFFICE 2,057,213

ROLLER BEARING

Edward A. Skyiepal, Beaumont, Tex., assignor of one-half to Gulf Coast Machine & Supply Company, Beaumont, Tex., a corporation Application April 23, 1934, Serial No. 721,909

7 Claims. (Cl. 308—235)

The invention relates to an improvement in roller bearings, and particularly of the type which is adapted to carry a considerable load and withstand extremely rough usage.

It is one of the objects of the invention to provide a roller bearing wherein the bearing is made up of a plurality of annular tapered roller members which are coaxially arranged in such a manner that the load will be distributed evenly upon them.

Another object of the invention is to provide a roller bearing wherein the supporting shaft is carried by a retainer member and the bearing is made up of a plurality of rollers which are spaced apart by anti-friction means.

Another object of the invention is to provide a composite bearing member for roller bearings which is made up of spaced tapered roller members.

Another object of the invention is to provide a bearing wherein alternate rollers are made up of different numbers of roller members.

Another object of the invention is to provide a roller bearing wherein the bearing may be assembled and positioned in a retainer member so that the rollers are spaced apart by anti-friction means.

A still further object of the invention is to provide a bearing member for roller bearings wherein the bearing is made up of a plurality of independent roller members which can rotate at different rates during operation of the bearing.

Other and further objects of the invention will be readily apparent when the following description is considered in connection with the accompanying drawing wherein.

It is contemplated that this roller bearing may be used in any desired position where roller bearings are ordinarily employed, and as usual is arranged to operate between the opposite bearing races 2 and 3. As is well understood, in many instances these race members form a part of the construction in which the roller bearing is to operate, and in other instances the race members are independent of the structure and are merely inserted to serve as a trackway for the roller bearing. For this reason, the opposite races 2 and 3 are shown as independent members, but it is to be understood that they may be formed as a part of the structure in which the roller bearing is to be incorporated.

Figure 1:
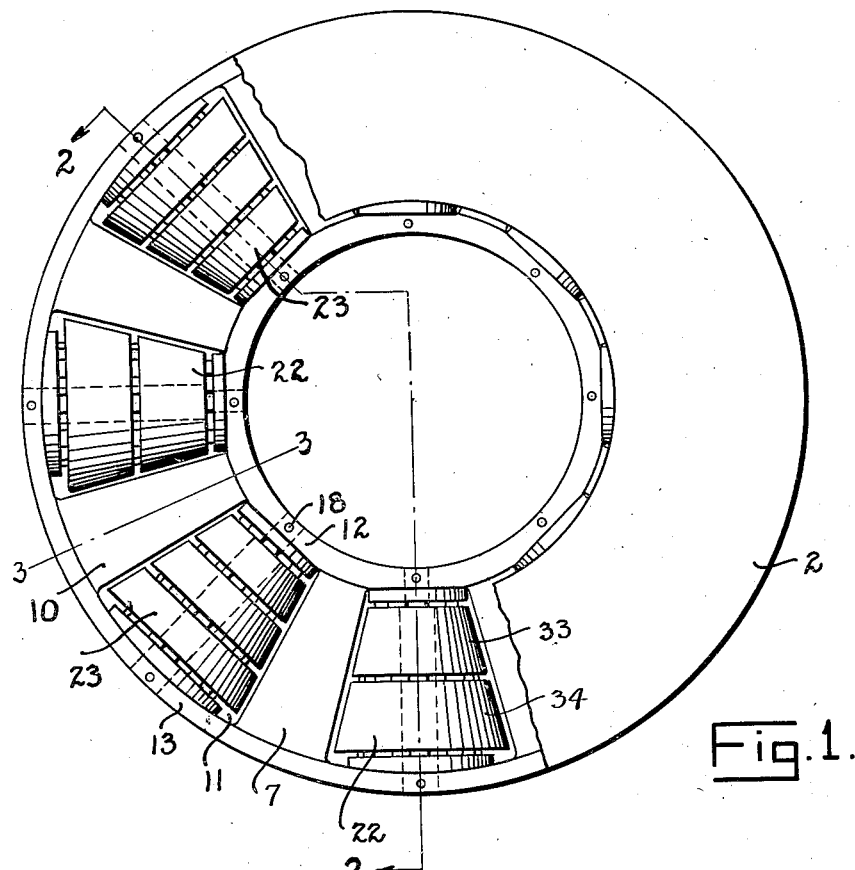
Fig. 1 is a top plan view of a roller bearing made up in accordance with the invention, and showing a portion of the upper bearing race broken away to illustrate the manner of arranging the different bearings.

The race members 2 and 3 are formed with trackways 5 and 6 respectively, which are arranged to abut against the bearing which is indicated generally at 7. The roller bearing is made up of a retainer member 10 which is here illustrated as an annular ring which is provided with a plurality of bearing receiving openings 11 which are radially disposed in the retainer 10. As is best seen in Fig. 1, the openings 11 are tapered along a radius from the center, but different tapers may be used if desired.

Each of the openings 11 is arranged to receive a composite bearing and is defined by an inner bridge 12 and an outer bridge 13. These bridges are that part of the retainer member which span the openings. Both of these bridges are provided with a shaft opening such as 15 which is adapted to receive the roller supporting shaft 17. The shaft is held in position by suitable lock pins 18 in each of the openings. It is to be understood that the roller bearing may take other forms than the annular ring. The word "opposite" as applied to the races includes either upper or lower and inner or outer. Also if desired double tapered rollers may be used.

The bearing member itself is preferably made up of a plurality of roller discs such as 20. Each of these roller discs is of tapered configuration to conform with the taper of the track-ways 5 and 6, and it is intended that these disc members will be made up of different thicknesses so that some of the bearings such as 22 may be made up of a different number of rollers than other bearings such as 23.

The bearing 22 is shown as being made up of two roller members 20, whereas the bearing 23 is shown as being made up of three of the roller members which are of less thickness. This arrangement of rollers prevents the formation of ridges or rings in the track-ways 5 and 6 and results in an even and uniform wearing of the parts and distribution of the stresses. The provision of the tapering rollers permits distribution of the stresses in the bearing and rotation of one roller independent of the others if occasion so requires.

Each of the rollers is an annular disc which is preferably tapered according to the specifications which it must fulfill. The end faces 26 and 27 of each of the rollers, however, are provided with an annular groove such as 28 in order to receive the anti-friction balls or means 29. The corresponding grooves 28 in the adjacent faces of the two adjacent rollers cooperate together to support the roller balls 29. In this manner if relative rotation between the adjacent rollers is desired or necessary, there can be relative rotation without material friction so that resistance to rotation and frictional losses will be minimized. At the same time this construction permits a uniform distribution of the load to accommodate the inequality in construction or balance of the load.

The end faces of the roller members which are adjacent the inner and outer bridges of the race members are also provided with grooves similar to the groove 28, and are also provided with anti-friction bearings which are arranged to abut against the outer thrust plate 30, and the inner thrust plate 31. These thrust plates are so arranged that they will fill in the area adjacent the bridges 13 and 12, respectively, and present a flat surface upon which the antifriction balls may travel.

Figure 2:
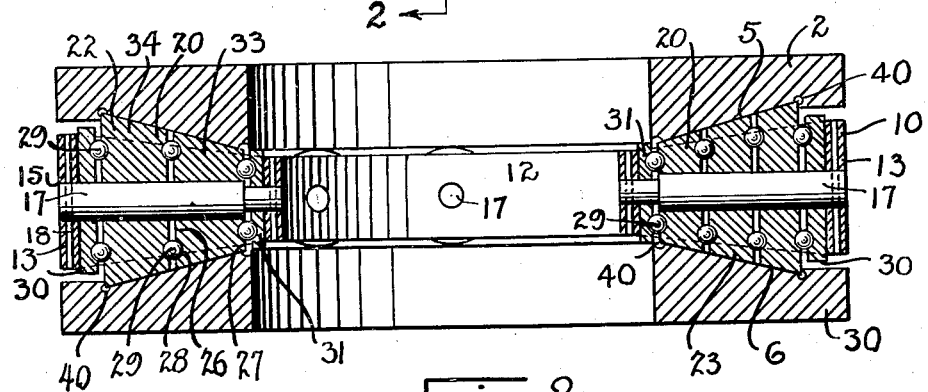
Fig. 2 is a sectional view of the roller bearings of Fig. 1 taken on the line 2—2.
Figure 3:
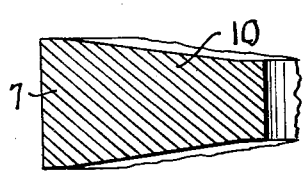
Fig. 3 is a section of the bearing retainer taken on the line 3—3 of Fig. 1.

In assemblying a bearing such as the bearing 22 shown in the lefthand side of Fig. 2, the thrust plates 30 and 31 are arranged with the rollers 33 and 34 between them, and with the anti-friction balls 28 distributed between the thrust plates and the rollers. With the parts in this position they are lowered into the bearing opening 11 and the shaft 17 passed through the outer bridge 18, the thrust plate 30, the rollers 34 and 33, respectively, and finally through the inner plate 31, and the inner bridge 12. The shaft in this manner serves to support the bearing as it is assembled and the lock pins 18 are then moved into position. This securely fixes the parts in the retainer member so that they are adapted for rotation.

The bearing 23 is identical with the bearing 22, except that in the form of the invention here illustrated, the bearing 23 is made up of three rollers instead of the two rollers shown in the bearing 22. In this manner the bearing 23 engages the track-ways 5 and 6 in such a manner that two annular rings or ridges tend to be formed on the track-ways because of the small space between the adjacent rollers, which is not contacted by the rollers during the ordinary operation of the roller bearings. To obviate the formation of any such ring the bearing 22 is made up of but two rollers which are of a different thickness and which tend to form but a single ridge substantially in the center of the track-ways 5 and 6.

With this alternate arrangement of the bearings made up of a different number of rollers, the entire surface of the track-ways is contacted by the rollers so that there will be no formation of any annular ridges to interfere with the operation of the rollers.

A particular feature of providing the plurality of rollers is that each roller may rotate independently of the other roller, and if for some reason one is damaged or becomes inoperative the remaining rollers may support the load and carry it for an indefinite period without material damage to the entire assembly. This permits a more uniform, even, distribution of the stresses and loads to be carried, and has been found to be exceptionally satisfactory.

Adjacent the inner and outer edges of the track-ways 5 and 6 are positioned the oil grooves 40 so that there may be an accumulation of lubricant at these points to assist in the lubrication of the bearing.

It is believed that it will be readily apparent that the different bearings may be repaired or replaced without molesting the other bearings, and that a roller bearing as a whole is provided which may carry enormous loads and which distributes the load because of the independent movement of the various parts.

What is claimed is:

1. A roller bearing comprising a bearing retainer, a plurality of bearings disposed in said retainer, each of said bearings comprising a plurality of annular tapered roller members, a shaft on which said members are mounted for rotation, said shaft being carried by said retainer, and anti-friction means disposed between adjacent members.

2. A roller bearing comprising a retainer, bearing openings therein, a shaft radially disposed in each opening, a plurality of roller members disposed on each shaft, and anti-friction spacers between said members.

3. A roller bearing including a bearing retainer, a plurality of bearings therein, each bearing being made up of a shaft, a plurality of rollers arranged thereon, a thrust plate at each end of the rollers, and antifriction bearings between both said rollers and said plates.

4. A roller bearing including a bearing member, said member comprising a shaft, a two roller disc thereon, a thrust plate at each end of the discs, and ball bearings between said discs and between said discs and plates.

5. A roller bearing including a plurality of bearings each made up of a plurality of tapered rollers, the number of rollers in each bearing being different from the number of rollers in the next adjacent bearing, a bearing retainer, thrust plates carried by said retainer and arranged to receive the axial thrusts of said rollers, and antifriction balls between adjacent rollers.

6. A roller bearing including bearing trackways, roller bearings made up of a plurality of rollers adapted to roll on said track-ways, alternate bearings being composed of a shaft carrying two rollers and the intermediate bearings being composed of a shaft carrying three rollers whereby said track-ways are worn in use over the entire surface, and antifriction balls at each end of each roller.

7. A roller bearing including a roller assembly, said assembly comprising a cage, a plurality of rollers journaled within said cage, each of said rollers including a plurality of separately rotatable frusto-conical members arranged to form a substantially frusto-conical roller, antifriction means disposed between said members and antifriction bearings between the outer ends of said rollers and said cage.

EDWARD A. SKYIEPAL.